US008654138B2

(12) United States Patent
Owen et al.

(10) Patent No.: US 8,654,138 B2
(45) Date of Patent: Feb. 18, 2014

(54) GRAPHICAL DATA CONVERSION/TRANSLATION

(71) Applicant: The Mathworks, Inc., Natick, MA (US)

(72) Inventors: James G Owen, Bolton, MA (US); Claudia G Wey, Wayland, MA (US); Richard A Spada, Millis, MA (US)

(73) Assignee: The Mathworks, Inc., Natick, MA (US)

( * ) Notice: Subject to any disclaimer, the term of this patent is extended or adjusted under 35 U.S.C. 154(b) by 0 days.

(21) Appl. No.: 13/972,514

(22) Filed: Aug. 21, 2013

(65) Prior Publication Data
US 2013/0339882 A1 Dec. 19, 2013

Related U.S. Application Data

(63) Continuation of application No. 13/241,462, filed on Sep. 23, 2011, now Pat. No. 8,543,939.

(60) Provisional application No. 61/494,165, filed on Jun. 7, 2011.

(51) Int. Cl.
G09G 5/00 (2006.01)
(52) U.S. Cl.
USPC .......................................... 345/581
(58) Field of Classification Search
USPC .......................................... 345/581
See application file for complete search history.

(56) References Cited

U.S. PATENT DOCUMENTS

2006/0074866 A1  4/2006  Chamberlain et al.
2012/0313953 A1  12/2012  Owen et al.

OTHER PUBLICATIONS

Kandel et al., "Wrangler: Interactive Visual Specification of Data Transformed Scripts," May 7-12, 2011, 10 pages, Vancouver, BC, Canada.
Google Refine, retrieved from: http://code.google.com/p/google-refine/, Print Date: Sep. 20, 2011, 94 pages.

Primary Examiner — Aaron M Richer
Assistant Examiner — Mohammad H Akhavannik
(74) Attorney, Agent, or Firm — Harrity & Harrity, LLP

(57) ABSTRACT

One or more computer-readable storage media for storing computer-executable instructions executable by processing logic is provided. The media storing one or more instructions that when executed by the processing logic causes the processing logic to receive data in a first format for conversion to a second format different than the first format, wherein the data includes information having a first type and information having a second type and display the data in the first format via a graphical interface. One or more translation rules are received relating to processing the information having the first type or the information having the second type. The one or more translation rules are pre-applied to the data in the first format. Effects of the pre-applied rules on the displayed data are displayed via the graphical interface. The data in the first format is converted to the data in the second format based on the one or more translation rules.

20 Claims, 10 Drawing Sheets

FIG. 9

GRAPHICAL DATA CONVERSION/TRANSLATION

CROSS-REFERENCE TO RELATED APPLICATION

This application is a continuation of U.S. patent application Ser. No. 13/241,462, filed Sep. 23, 2011, which claims priority under 35 U.S.C. §119, based on U.S. Provisional Patent Application No. 61/494,165, filed on Jun. 7, 2011, the disclosures of which are incorporated by reference herein.

BACKGROUND OF THE INVENTION

The prevalence of digital data has significantly increased the ease with which information in shared between various entities, such as different individuals, tools, software applications, devices, etc. Unfortunately, in many instances, the format of data is initially incompatible with a receiving entity or device. In such cases, to use the data, it may be necessary to reformat or convert the data into a compatible format.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 7-9 illustrates additional exemplary graphical user interfaces consistent with implementations described herein.

DETAILED DESCRIPTION

The following detailed description refers to the accompanying drawings. The same reference numbers in different drawings may identify the same or similar elements. Also, the following detailed description does not limit the invention.

Embodiments described herein relate to systems and methods for converting and/or translating data from one format to another. More specifically, a user may provide source data to a conversion/translation engine (CTE) in a first format, such as a spreadsheet format. The data may be graphically displayed via a graphical user interface (GUI) associated with the CTE. The user may provide one or more translation rules relating to processing the data via GUI. Execution of the translation rules converts or translates (referred to herein as "conversion" generally) at least a portion of the source data into a second format, usable by another application or programming element. For example, data unreadable by a particular application may be replaced with data that is readable by the application.

Consistent with embodiments described herein, the CTE may pre-apply the provided rules and graphically display the effects of the pre-applied rules on the displayed data. If the displayed results are in accordance with the user's wishes, the translation rules may be executed and converted data may be generated and stored.

One or more embodiments of the invention may be implemented on one or more computing devices. The one or more computing devices may be a system or part of a system. The one or more computing devices may include a desktop computer, a laptop computer, a client computer, a server computer, a mainframe computer, a personal digital assistant (PDA), a web-enabled cellular telephone, a smart phone, a smart sensor/actuator, or some other computing device.

Figure 1:
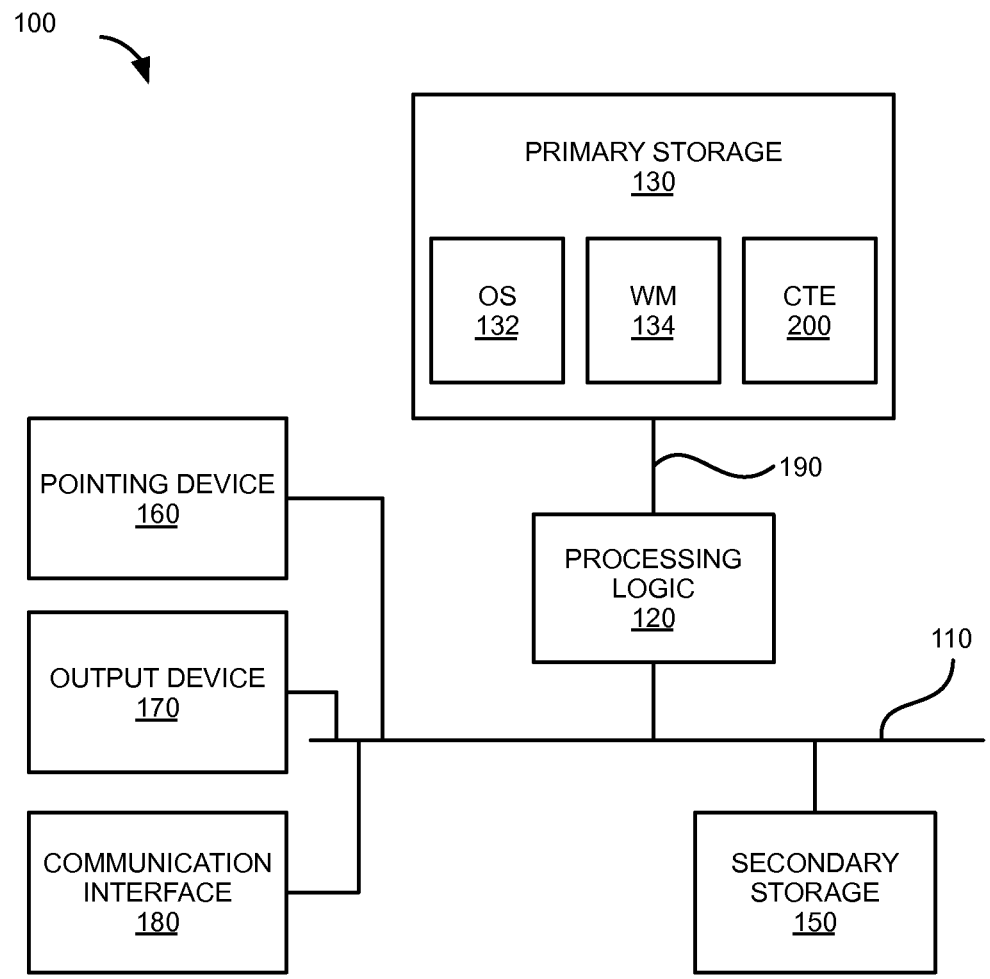
FIG. 1 illustrates an example of a computing device that may be configured to implement one or more embodiments of the invention.

FIG. 1 illustrates an example of a computing device 100 that may be configured to implement one or more embodiments of the invention. Referring to FIG. 1, computing device 100 may be associated with (e.g., include) one or more components including an input-output (I/O) bus 110, processing logic 120, a primary storage 130, a secondary storage 150, an input device 160, an output device 170, a communication interface 180, and a memory bus 190. Note that computing device 100 is an example of a computing device that may be configured to implement one or more embodiments described herein. It should be noted that other computing devices that may be less complicated or more complicated than computing device 100 may be configured to implement one or more embodiments of the invention.

I/O bus 110 may be an interconnect bus configured to enable communication among various components in computing device 100, such as processing logic 120, secondary storage 150, pointing device 160, output device 170, and communication interface 180. The communication may include, among other things, transferring information (e.g., data and control information) between the components.

Memory bus 190 may be an interconnect bus configured to enable information to be transferred between processing logic 120 and primary storage 130. The information may include instructions and/or data that may be executed, manipulated, and/or otherwise processed by processing logic 120. The instructions and/or data may include instructions and/or data that are configured to implement one or more embodiments described herein.

Processing logic 120 may include logic configured to interpret, execute, and/or otherwise process information contained in, for example, primary storage 130 and/or secondary storage 150. The information may include instructions and/or data configured to implement one or more embodiments described herein. Processing logic 120 may comprise a variety of heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units, or other types of processing logic that may interpret, execute, manipulate, and/or otherwise process the information. Processing logic 120 may comprise a single core or multiple cores. An example of a processor that may be used to implement processing logic 120 is the Intel® Xeon® processor available from Intel Corporation, Santa Clara, Calif.

Secondary storage 150 may be a computer-readable media that is accessible to the processing logic 120 via I/O bus 110.

Secondary storage 150 may be configured to store information for processing logic 120. The information may be executed, interpreted, manipulated, and/or otherwise processed by processing logic 120. Secondary storage 150 may comprise, for example, a storage device, such as a magnetic disk, optical disk, random-access memory (RAM) disk, flash drive, etc. The information may be stored on one or more computer-readable media contained in the storage device. Examples of media that may be contained in the storage device may include magnetic discs, optical discs, and memory devices (e.g., flash memory devices, static RAM (SRAM) devices, dynamic RAM (DRAM) devices, or other memory devices). The information may include data and/or computer-executable instructions that may implement one or more embodiments of the invention.

Input device 160 may include one or more mechanisms that permit a user to input information into computing device 100, such as a keyboard, keypad, or control buttons, a microphone, a remote control, a touch-screen display (e.g., touch screen display 110), a camera or video camera, a computer mouse, trackball, gyroscopic device (e.g., gyroscope), mini-mouse, stylus, graphics tablet, joystick (isotonic or isometric), pointing stick, accelerometer, palm mouse, foot mouse, puck, eyeball controlled device, finger mouse, light pen, light gun, eye tracking device, steering wheel, yoke, jog dial, space ball, directional pad, dance pad, soap mouse, haptic device, tactile device, and discrete pointing device. For example, input device 160 may be a computer mouse that includes switches or buttons that may enable a user to point, click, and drag items in a display. Movements of the pointing device may be echoed on the display by movements of a pointer, cursor, and/or other visual changes.

Output device 170 may include one or more mechanisms that may output information from computing device 100. Output device 170 may include logic that may be directed by, for example, processing logic 120, to output the information from computing device 100. The information may be presented in the form of a display that may be displayed by output device 170. The information may include, for example, graphical user interface (GUI) elements (e.g., windows, widgets, etc.), a graphical block diagram of a model, text, or other information. Output device 170 may include, for example, a cathode ray tube (CRT), plasma display device, light-emitting diode (LED) display device, liquid crystal display (LCD) device, vacuum florescent display (VFD) device, surface-conduction electron-emitter display (SED) device, field emission display (FED) device, haptic device, tactile device, printer, speaker, video projector, multi-dimensional display device, or other output device.

Communication interface 180 may include logic configured to interface computing device 100 with, for example, a communication network and enable computing device 100 to communicate with entities connected to the network. An example of a network that may be used with computing device 100 will be described further below with respect to FIG. 8.

Communication interface 180 may include a transceiver-like mechanism that enables computing device 100 to communicate with the entities connected to the network. Communication interface 180 may be implemented as a built-in network adapter, network interface card (NIC), Personal Computer Memory Card International Association (PCM-CIA) network card, card bus network adapter, wireless network adapter, Universal Serial Bus (USB) network adapter, modem or other device suitable for interfacing computing device 100 to the network.

Primary storage 130 is accessible to processing logic 120 via bus 190. Primary storage 130 may comprise one or more computer-readable media configured to store information for processing logic 120. The information may include computer-executable instructions and/or data that are configured to implement operating system (OS) 132, windows manager (WM) 134, and conversion/translation engine (CTE) 200. The instructions may be executed, interpreted, and/or otherwise processed by processing logic 120.

Primary storage 130 may comprise a RAM that may include RAM devices configured to store information (e.g., data, executable instructions). The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (FeRAM) devices, magneto-resistive RAM (MRAM) devices, phase change memory RAM (PRAM) devices, or other types of RAM devices.

OS 132 may be a conventional operating system that may be configured to implement various conventional operating system functions. These functions may include, for example, scheduling one or more portions of CTE 200 to run on processing logic 120, managing primary storage 130, controlling access to various components associated with computing device 100 (e.g., pointing device 160, output device 170, network interface 180, secondary storage 150), and controlling access to data received/transmitted by these components. Examples of operating systems that may be adapted to implement OS 132 include the Linux operating system, Microsoft Windows operating system, the Symbian™ operating system, and the Android™ operating system. A version of the Linux operating system that may be used is Red Hat Linux available from Red Hat Corporation, Raleigh, N.C. Versions of the Microsoft Windows® operating system that may be used include the Microsoft Windows Vista and Microsoft Windows XP operating systems available from Microsoft Inc., Redmond, Wash.

WM 134 may be a conventional window manager that enables graphical user interface (GUI) elements, such as widgets, to be managed in a display that may be displayed by output device 170. WM 134 may also be configured to (1) capture one or more positions of pointing device 160 and/or other data associated with pointing device 160, and (2) provide the positions and/or data to OS 132 and/or CTE 200. The positions and/or data may be provided, for example, in messages that are sent to OS 132 and/or CTE 200. Examples of window managers that may be used with one or more embodiments of the invention include, but are not limited to, the X windows manager (e.g., GNOME, KDE), which is often used with the Linux operating system, and window managers used with the Microsoft XP and Vista operating systems. It should be noted that other window managers or components that are configured to implement various functions associated with window managers may be used with one or more embodiments of the invention.

CTE 200 may be executed as a standalone application or as a plug-in or component of another application, such as a modeling environment (e.g., a graphical modeling environment, textual modeling environment) or other data processing environment that may be configured to implement one or more embodiments of the invention. Some or all of CTE 200 may operate under the control of OS 132.

Figure 2:
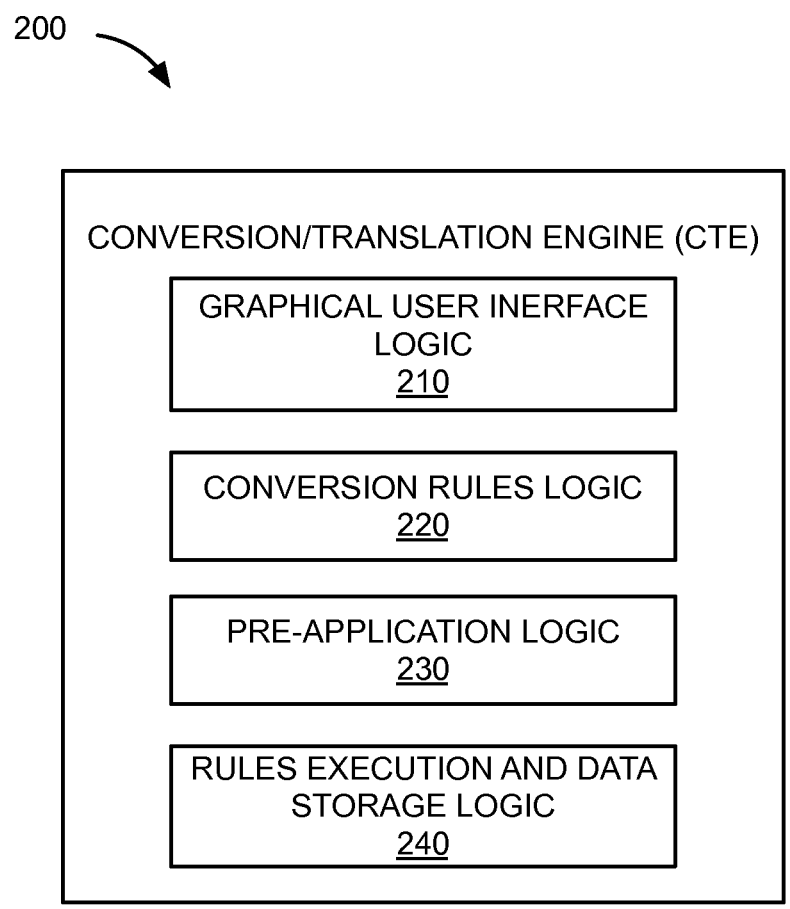
FIG. 2 illustrates an example of a conversion/translation environment (CTE) that may be configured to implement one or more embodiments of the invention.

FIG. 2 illustrates an example implementation of CTE 200. As shown, CTE 200 may comprise various components including graphical user interface (GUI) logic 210, conversion rules logic 220, pre-application logic 230, and rules execution and data storage logic 240. As briefly described above, CTE 200 may be configured to, among other things, convert or translate data consistent with implementations described herein.

CTE 200 may include hardware-based and/or software-based logic configured to provide a computing environment that may allow, for example, a user to perform tasks related to disciplines, such as, but not limited to, mathematics, science, engineering, medicine, business, biology, finance, and so on. As described, CTE 200 may include a plug-in or component, such as a component of a modeling environment such as MATLAB®, or a plug-in for a data processing application such as Microsoft Excel®.

Additional examples of CTEs that may incorporate one or more embodiments of the invention include, but are not limited to, Simulink®, Stateflow®, and SimEvents®, which are available from The MathWorks, Inc.; Unified Modeling Language (UML); profiles associated with UML (e.g., Modeling Analysis and Real-Time Embedded Systems (MARTE), Systems Modeling Language (SysML), Avionics Architecture Description Language (AADL), etc.); GNU Octave from the GNU Project; MATRIXx and LabView® from National Instruments; Mathematica from Wolfram Research, Inc.; Mathcad from Mathsoft Engineering & Education Inc.; Maple from Maplesoft; Extend from Imagine That, Inc.; Scilab and Scicos from The French Institution for Research in Computer Science and Control (INRIA); Modelica or Dymola from Dynasim AB; VisSim from Visual Solutions; SoftWIRE from Measurement Computing Corporation; WiT from DALSA Coreco; VEE Pro and SystemVue from Agilent Technologies, Inc.; Vision Program Manager from PPT Vision, Inc.; Khoros from Khoral Research, Inc.; VisiQuest from Pegasus Imaging Corporation; Gedae from Gedae, Inc.; Virtuoso from Cadence Design Systems, Inc.; Rational Rose, Rhapsody and Tau from International Business Machines (IBM), Inc.; SCADE from Esterel Technologies; and Ptolemy from the University of California at Berkeley.

Consistent with embodiments described herein, CTE 200 may contain computer-executable instructions and data that are configured to perform various tasks, as described herein. More specifically, GUI logic 210 may include logic configured to receive user information and commands relating to converting selected or identified source data from a first format to a second format based on one or more defined rules. For example, GUI logic 210 may receive an identification of a particular group of source data in a first format (such as a file designation). GUI logic 210 may retrieve the source data and graphically display the data to the user for interaction. As described in additional detail below, GUI logic 210 may be configured to receive one or more conversion/translation rules, output pre-processed data, and receive user instructions relating to the received rules and data.

Conversion rules logic 220 may include logic configured to receive one or more rules for transforming or converting portions of received/retrieved source data into a different format type, or to re-characterize a portion of the data into a particular data type or configuration. For example, consistent with implementations described herein, such rules may define data exclusions, data replacements, and data format conversions. By way of example, assume that a received data file includes a listing of dates provided in the formation mm-dd-yyyy (e.g., 05-01-2011 for May 1, 2011). A conversion rule may be received that operates on the retrieved data to convert dates in this format to a dd.mm.yyyy format (e.g., 01.05.2011).

In one implementation, conversion rules logic 220 may establish conversion rules based on rule criteria received via the GUI. Such rules may be based on pre-set rule types having user-configurable variables and criteria. The established rules may be stored in a primary or second storage 130/150 for subsequent use by pre-application logic 230 and rules execution logic 240 in the manner described below.

In an exemplary implementation, rules established and stored by conversion rules logic 220 may each have a priority or execution order associated therewith. In this manner, it is possible to generate interdependent rules. For example, a first rule may convert data from a string-based format to a numeric format (e.g., dates from a Month, Day, Year format or a mm.dd.yyyy to a serial date format, such as a MATLAB® serial date format). A second rule may exclude non-numeric data. By ordering the rules in this manner, the date cells in the data may not be excluded, since they were initially converted to numeric format date cells, thereby avoiding exclusion by the second rule.

Consistent with embodiments described herein, rule ordering may be established via GUI logic 210. For example, established rules may be dragged and dropped to desired positions in a listing of rules, as described below.

Pre-application logic 230 may include logic configured to process the retrieved source data based on the conversion rules established and stored by conversion rules logic 220 and any additional inferential processing performed based on a type of the requested conversion or other factors. Inferential processing may include metadata processing associated with the data, such as data type identification, variable name generation, data segmentation, etc. Consistent with embodiments described herein, pre-application of rules and inferential processing may be performed automatically upon designation of source data and may be dynamically updated upon addition of or modification of conversion rules or any other conversion criteria, such as target format designation, etc.

The results of the data processing by pre-application logic 230 may be forwarded to GUI logic 210 for output in conjunction the displayed data. In one embodiment, the output takes the form of graphical overlays of the processed or converted data over the original data. In this manner, the user can easily identify what data has been changed or transformed and the manner of the transformation. In one embodiment, color-coding may be associated with each rule established via conversion rules logic 220. Output of pre-processed data may be similarly styled (e.g., color-coded), thereby further enhancing the ability to easily identify the effects of the established rules.

Rules execution and data storage logic 240 may include logic configured to perform final conversion/translation of the initial source data upon user review of the pre-applied conversion/translation generated by pre-application logic 230. In one implementation, execution of the final conversion/translation may be initiated via the GUI, such as via a button or menu command associated with the GUI. Rules execution and data storage logic 240 may output the processing and converted data for storage in primary or secondary storage 130/150 for subsequent use.

Figure 3:
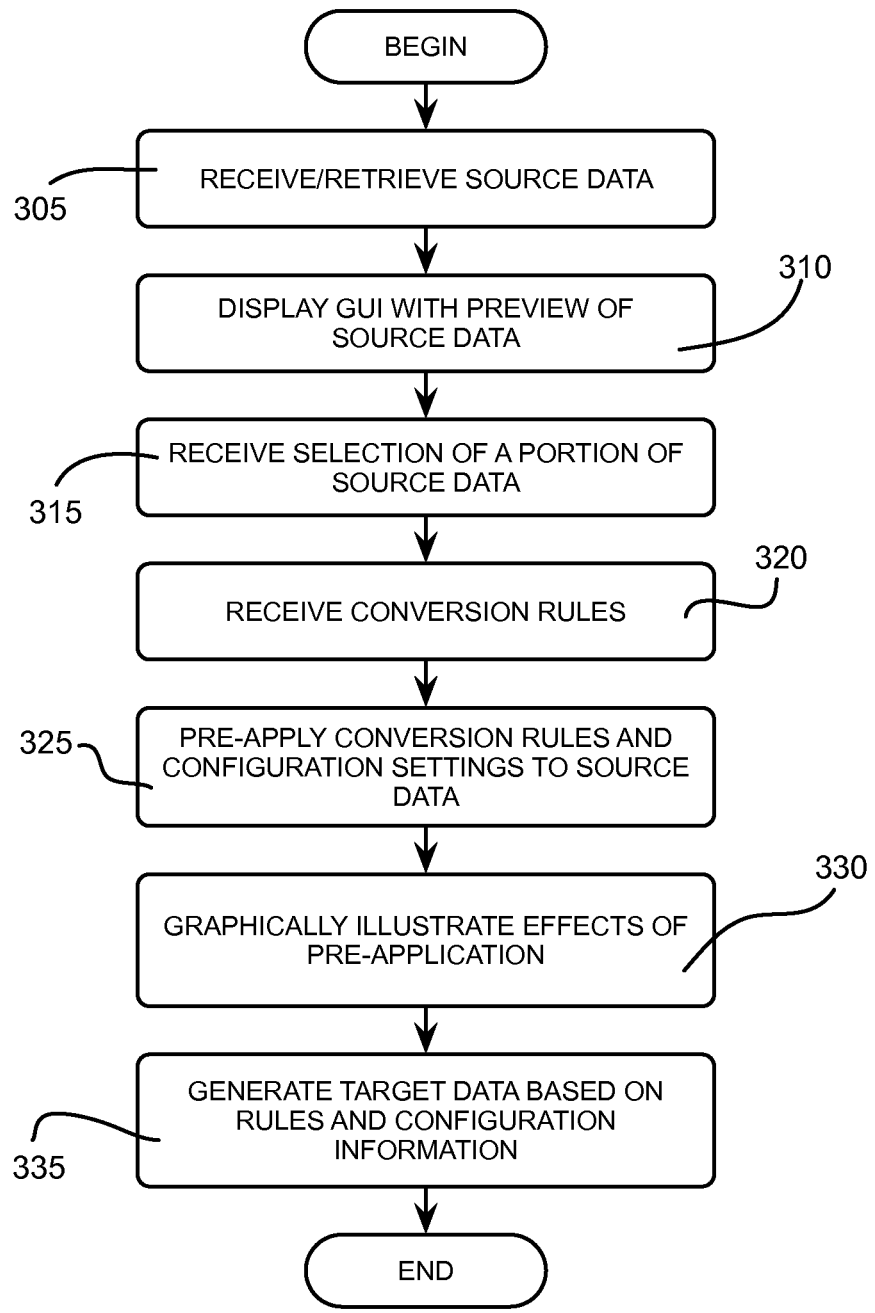
FIG. 3 illustrates a flowchart of an exemplary process for converting or translating source data from a first format to a second format in accordance with implementations described herein.

FIG. 3 illustrates a flowchart of an exemplary process 300 for converting or translating source data from a first format to a second format in accordance with implementations described herein. Process 300 may begin with CTE 200 receiving or retrieving source data for processing (block 305). For example, in one implementation, a user may initiate processing of CTE 200 via a different application, such as a data processing application, such as MATLAB®. In such an implementation, a user may select to import data into MATLAB via an Import menu command in the MATLAB interface. In response, MATLAB may query the user regarding the source of the data. The user may then indicate the location or content of the data in response to this query. Selection of the source data may trigger execution of CTE 200.

Figure 4:
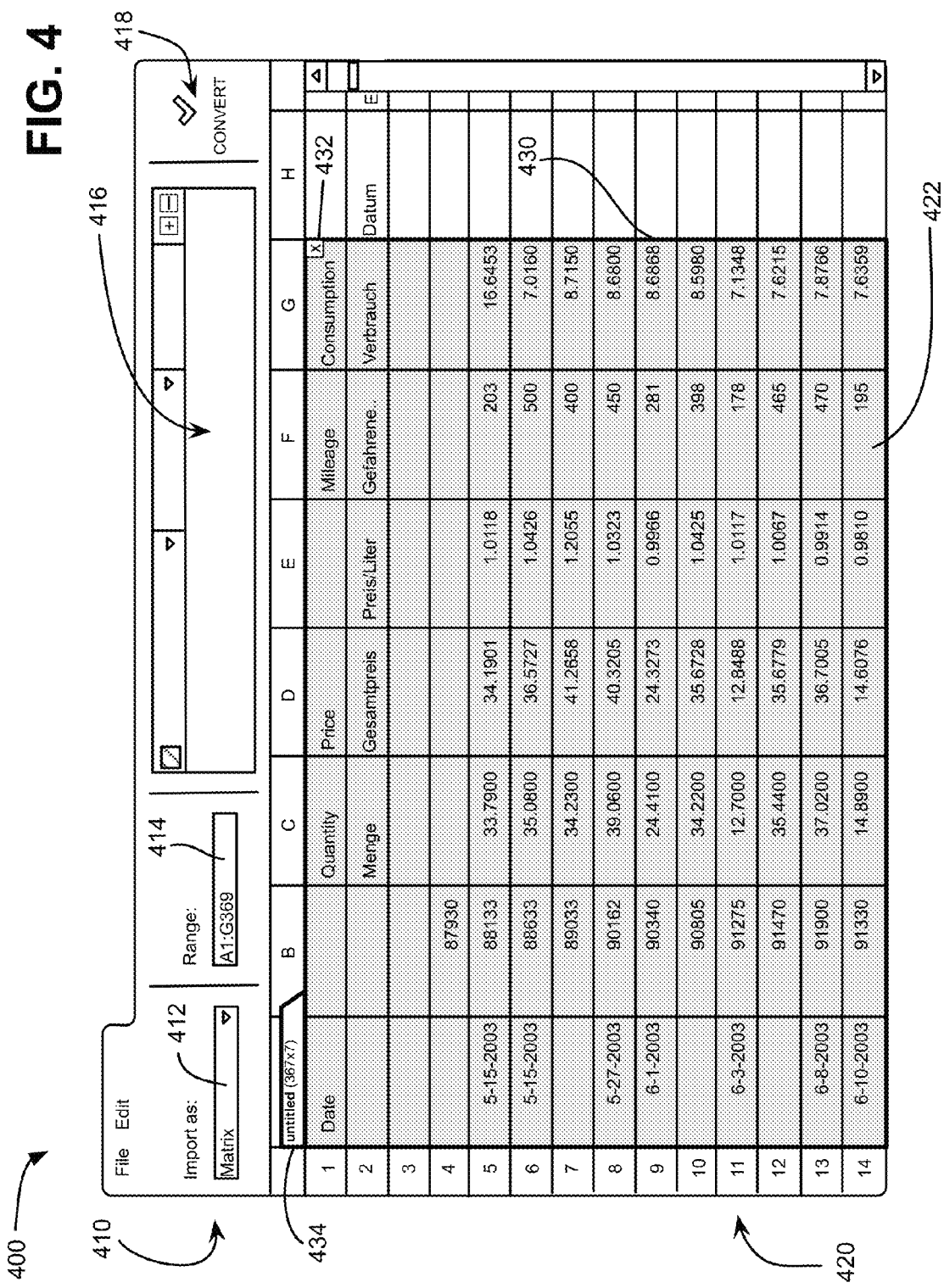
FIGS. 4-5 illustrates an exemplary graphical user interface consistent with implementations described herein.

CTE 200 may generate and output a graphical user interface based on the retrieved/received source data (310). For example, GUI logic 210 may generate a GUI that includes a least a portion of the source data depicted in the initial source format. FIG. 4 illustrates one exemplary GUI 400 consistent with implementations described herein. As shown, GUI 400 may include a windowed configuration having a configuration area 410 and a data preview area 420. Configuration area 410 may include target type selection element 412, a data range element 414, a conversion rules area 416, and a conversion (or importation) selection element 418. Data preview area 420 may include a spreadsheet-like configuration, comprising a number of rows and columns for initially displaying source data 422 in a source data format (e.g., the format of the source data).

In general, the elements of configuration area 410 may enable a user to initiate conversion or translation of source data 422 by providing a number of interface elements for selecting data or importation type for converted data, a portion 430 of source data 422 to be converted, and a number of conversion rules to be applied to source data 422. For example, target type selection element 412 may include a selection element such as a drop down menu, pick list, etc. for enabling a user to select a target data type for conversion from source data 422 (or a portion of the source data, as described below). By way of example, target data types may include matrix, array, column vectors, dataset, etc. Other conversion types may also be implemented for non-numeric data, such as video, audio, image conversions. In such implementations, conversions may include related processing, such as resolution changes, cropping, matting, enhancing, encoding changes, etc.

Data range element 414 may enable the user to specify one or more portions 430 of source data 422 for conversion or translation. For example, as described above, when data preview area 420 includes a spreadsheet-like configuration, preview area 420 may include a number of rows denoted by numerical designations (e.g., 1, 2, 3, etc.) and a number of columns designated by alphabetical designations (e.g., A, B, C, D, etc.). In such an implementation, data range element 414 may be configured as a text box for receiving user input of a range of data, such as A1:G369 as shown in FIG. 4, designating the data from cell A1 to cell G369 inclusive.

In other implementations, the user may select the portions 430 of source data 420 for conversion via interaction with preview area 420 using input device 160, such as a keyboard or computer mouse. In such an implementation, the user may select (e.g., by clicking and dragging, etc.) portion 430 of the data in preview area 420. Upon selection, data range element 414 may be updated to reflect the selected portion 430.

As shown in FIG. 4, in one implementation, data preview area 420 of GUI 400 may graphically identify the selected portion 430 of source data 422, such as by highlighting, low-lighting (e.g., spotlighting), circling, etc. In addition, once selected, portion 430 may be provided with a graphical element or affordance 432 for enabling the user to deselect the selection. As shown in FIG. 4, in one embodiment, such a graphical element may include a box having an "x" positioned therein.

In addition, consistent with embodiments described herein, portion 430 may be provided with a description element 434 identifying a title or name to be associated with selected portion 430 and a size of the selected portion. In the example of FIG. 4, description element 434 indicates that the initial name of the selected portion 430 is "untitled" and its size is 367 rows by 7 columns. In some embodiments, the displayed size may indicate a size of the selected portion in the target or destination format following any exclusions applied to the data. The user may interact with description element 434 to edit the name associated with portion 430. Editing a name in description element 434 may cause a corresponding data type in an output data file to also be renamed or modified. Consistent with embodiments described below, CTE 200 (e.g., pre-application logic 230) may infer or determine information regarding selected portions 430, such as name, data type, etc. In such an implementation, headings or other information in source data 422 may be used to determine the initial content of description element 434. In addition, it should be noted that, where additional selected portions 430 have been selected, each portion may be provided with respective deselection and description elements 432.

Conversion rules area 416 may be configured to receive criteria for conversion rules to be applied to selected portion 430 of source data 422. Upon initial retrieval of source data 422 and selection of portion 430, conversion rules 416 may be initially unpopulated. That is, no rules may be provided. In other implementations, one or more pre-populated rules may be included within conversion rules area 416, for example, based on the content of the source data and the target data type. For example, if source data 422 is a spreadsheet containing dates and the target data type is a numeric matrix, conversion rules area 416 may be pre-populated with a date conversion rule.

As described below, CTE 200, via GUI logic 210 and conversion rules logic 220, may receive user selection of one or more rules for user in performing pre-application and eventual conversion of source data 422.

Conversion (or importation) selection element 418 may include a graphical element, selection of which causes CTE 200 (e.g., rules execution and data storage logic 240) to execute the conversion process in accordance with the information presented via GUI 400. That is, rules execution and data storage logic 240 may convert source data 422 into target data (not shown), and may store the target data in a location suitable for subsequent use, such as by the calling software program or entity (such as MATLAB). In some implementations, as described below, selection of conversion selection element 418 may cause rules execution and data storage logic 240 to generate and output computer code relating to the conversion for use by other programs, applications, or applied to other input data sets. For example, the output code may define the various rules received via conversion rules area 416, as well as the configuration information received and/or described via configuration area 410.

Returning to FIG. 3, once the initial source data has been displayed, a selection of at least a portion of the source data may be received from the user (block 315). For example, as described above, the user may interact with a data range element 414 and/or data preview area 420 to select portion 430 of source data 422.

A number of conversion rules or other conversion information may be received from the user (block 320). For example, conversion rules logic 220 may receive and store one or more conversion/translation rules from the user via interaction with conversion rules area 416 in GUI 400. In one embodiment, each of the received conversion rules may include identification criteria and operation criteria. For example, a received conversion rule may define that all rows having any non-numeric cells in selected portion 430 be excluded from the generated target data. In this example, the identification criterion is "any non-numeric cells" and the operation criterion is "exclude." Other exemplary operations may include replacement, cell data conversion, etc. In some embodiments, an operation may require a designation of additional criteria, such as what value to replace an indentified value with, what format to convert an identified value into, etc.

In addition to the conversion rules, other conversion/translation information may be received in block 320. For example, target data type selection element 412 may enable a user to select a target data type for use in performing the converting source data 422. Exemplary target data types include matrix, matrices, column vectors, row vectors, datasets, timeseries, data object, etc. A matrix refers to a multi-dimensional table of numeric data. Column and row vector refers to single-dimensional arrays of data. A dataset refers to a hybrid data collection that may include more than one type of information. A timeseries is a matrix that stores data and time values, as well as the metadata information that includes units, events, data quality, and interpolation method. Each type of conversion/translation may introduce different requirements for conversion for source data to target data. For example, matrices may not include non-numeric data, etc.

Upon addition of at least one conversion rule, the conversion rule(s) may be pre-applied to selected portion(s) of source data (block 325) and the preview display may be updated to graphically illustrate the effects of application of the rule(s) (block 330). For example, pre-application logic 230 may dynamically retrieve the conversion rules, determine the effects of the rules (e.g., process the source data in accordance with the rules) and update data preview area 420 to depict the effect of conversion rules on potentially output target data.

Figure 5:
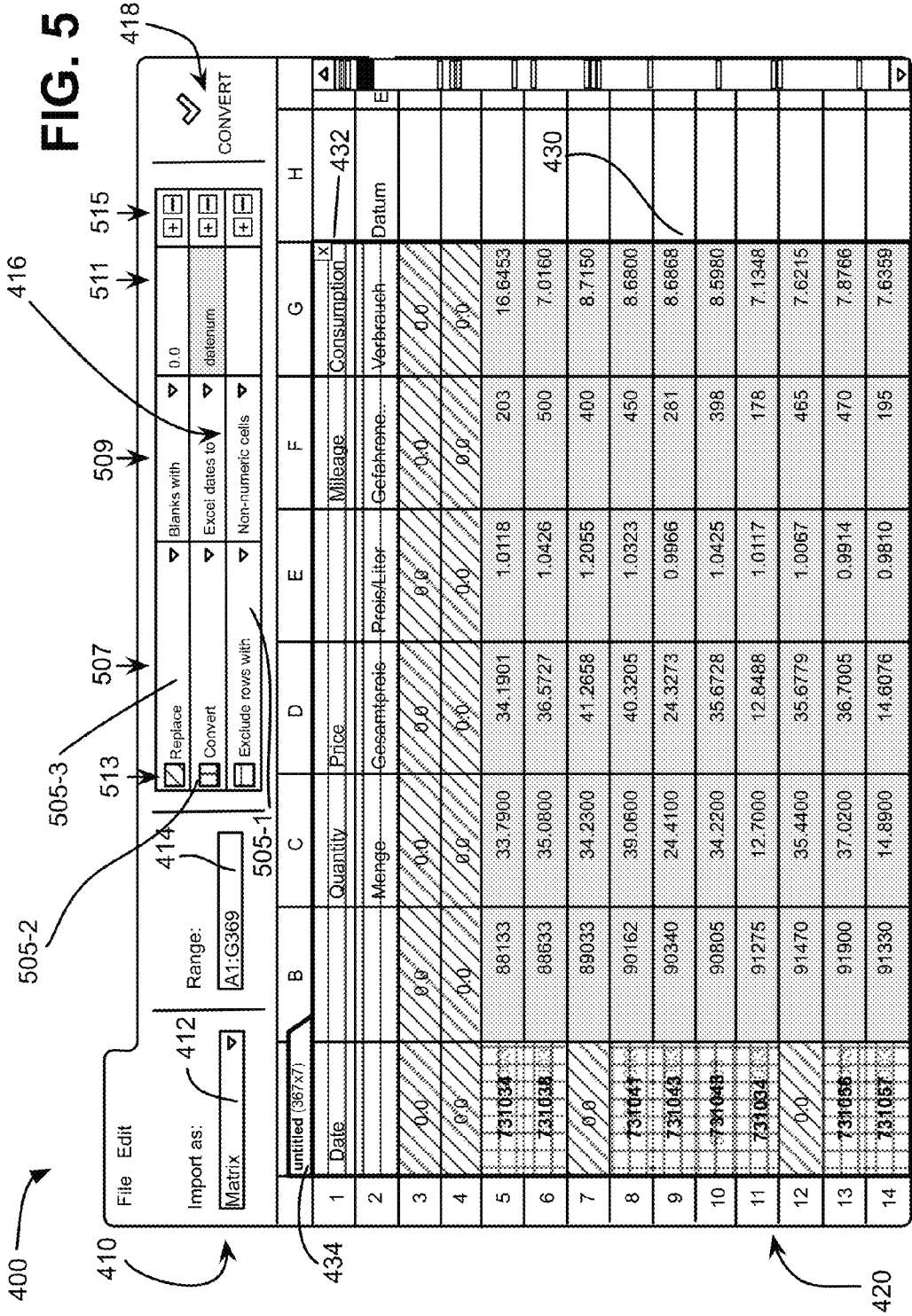

FIG. 5 illustrates GUI 400 of FIG. 4 following addition of a number of conversion rules in a manner consistent with implementations described herein. As shown, conversion rules area 416 may include a generally tabular interface in which each received or created conversion rule is depicted as an entry row in table, and the criteria for the rule is depicted as columns in the row. For example, conversion rules area 416 in FIG. 5 shows three conversion rules 505-1, 505-2, ad 505-3 (collectively referred to as "conversion rules 505" and individually as "conversion rule 505"). Each conversion rule 505 includes an operation element 507, a data identifying element 509, and, where necessary, a target value indicating element 511. In addition, each conversion rule 505 includes a graphic identifier element 513, and an add/remove indicator 515.

In one implementation, operation element 507 may include a drop down menu or pick list identifying available rule operations. Exemplary operations include replacement operations, conversion operations, and exclusion operations, although other operations may be available without departing from the spirit or scope of the embodiments described herein. As defined herein, a "replacement" operation refers to CTE 200 removing identified data from the source data and inserting, in its place, defined replacement data. A "conversion" operation refers to modifying a format of identified source data. An "exclusion" operation refers to removing or eliminating defined data from the output target data. In some embodiments, exclusion operations may be performed on entire rows or columns of source data.

Data identifying element 509 may include a drop down menu or pick list identifying available identification mechanisms associated with a particular operation element 507. For example, upon user selection of a particular operation element 507, GUI logic 210 may determine available types of source data identification elements, and provide the identified types as options in data identifying element 509. Target value indicating element 511 may include an interface element for receiving an indicating of a replacement format or data value corresponding to the associated operation. For example, target value indicating element 511 associated with a replacement operation may indicate a particular data value or a string using a regular expression. In contrast, a target value indicating element 511 associated with a convert operation may indicate a data type or format type.

Graphic identifier element 513 may indicate a color or other graphical indicia or visual style (e.g., shading, highlighting, cross-hatching, underlining, font type, typefacing (italics, bold, etc.), etc.) associated with a particular rule. As described below, the graphic identifier element 513 may be used to enable the user to easily identify source data that has been acted upon or affected by a particular conversion rule 505. Add/remove indicator 515 may be provided to enable the user to remove an existing rule (e.g., the "minus" sign) or add a new rule (e.g., the "plus" sign). For example, selection of the plus sign in add/remove indicator 515 my result in addition of a new blank rule immediate below the selected indicator 515.

In the example of FIG. 5, rule 505-1 defines an "exclude" rule in which operation element 507 is defined as "exclude rows with," and data identifying element 509 is defined as "non-numeric cells." For this operation, no target value indicating element 511 is necessary. Pre-application or execution of rule 505-1 identifies and excludes from output target data, any rows in selected portion 430 that include any non-numeric cells.

Rule 505-2 defines a "convert" rule in which operation element 507 is defined as "convert," data identifying element 509 is defined as "Excel dates to," and target value indicating element 511 is defined as "datenum." Pre-application or execution of rule 505-2 identifies any cells that include Excel formatted dates and converts the dates to the MATLAB datenum format (a serial date format useable in MATLAB).

Rule 505-3 defines "replace" rule in which operation element 507 is defined as "replace," data identifying element 509 is defined as "blanks with," and target value indicating element 511 is defined as "0.0." Pre-application or execution of rule 505-3 identifies any cells that are blank and replaces them with the number 0.0. In this manner, replace rules may be used to convert data otherwise incompatible with the target data format (e.g., blank cells in the case of rule 505-3) with compatible data.

As described above-upon entry of at least one conversion rule 505 in conversion rules area 416, data preview area 420 may be automatically updated to graphically depict the effects of the established rules. Consistent with embodiments described herein, such graphical depiction may include a number of different visual styles or color-coded overlays on selected portion 430 of source data 422 in which the overlays include the modified or converted data and the applied visual style (e.g., color, shading, etc.) indicates conversion rule 505 that caused the modification. In this manner, the user is easily and substantially instantaneously able to determine the effect that a particular rule may have, without losing the ability to view or determine the content of the original source data. In some implementations, the output graphical overlays may be toggled on or off via a user-selected option or configurations setting.

As shown in FIG. 5, graphic identifier element 513 associated with rule 505-1 includes vertical cross-hatching, graphic identifier element 513 associated with rule 505-2 includes crisscross-hatching, and graphic identifier element 513 associated with rule 505-3 includes diagonal cross-hatching. It should be understood that various other types of visual styles may be used, such as colors, type faces, fonts, highlighting, etc. Accordingly, in some embodiments, associated of visual styles to conversion-rules may be referred to as "color-coding."

Upon entry/creation of conversions rules 505, the visual style corresponding to the graphic indicator elements 513 of the applied rules 505 may be depicted in corresponding portions selected portion 430 in data preview area 420. For example, as shown in FIG. 5, pre-application of conversion rule 505-1 (vertical cross-hatching indicia) causes various rows in selected portion 430 to be excluded from output target data. This effect is represented by applying or overlaying the visual style associated with graphic identifier element 430 of rule 505-1 to the affected portions of selected portion 430. In the illustrated portion of FIG. 5, this includes rows 1 and 2.

Simultaneously, any corresponding value changes in affected portions of selected portion 430 may be similarly overlaid over the affected data in data preview area 422. Because conversion rule 505-1 is an exclusion rule and not a replacement or conversion rule, no data changes are depicted. However, pre-application of conversion rule 505-2 (crisscross-hatching indicia) causes a number of cells in column A in selected portion 430 to be converted in accordance with the rule. This effect is represented by applying or overlaying the crisscross-hatching indicia to the affected cells, and by also overlaying the converted values of the affected cells. For example, the Excel formatted date value of 5-15-2003 in cell A5 of portion 430 is overlaid with a converted datenum value of 731034. Using both the visual style and the overlaid resulting data value, users are easily able to determine which rule is applied and what the resulting effect on the data is.

Similarly, pre-application of conversion rule 505-3 (diagonal cross-hatching indicia) causes a number of cells in rows 3 and 4 in selected portion 430 to be converted in accordance with the rule. This effect is represented by applying or overlaying the diagonal cross-hatching indicia to the affected cells, and by also overlaying the converted values of the affected cells (the number "0.0" in this example).

In an additional implementation, a "hover" or "mouseover" effect may be further used to highlight the changes resulting from conversion rule application. For example, GUI 400 may determine that the user has positioned a pointing device cursor over a particular portion of the preview data. GUI 400 may cause the all cells corresponding to the particular rule to be further highlighted, the corresponding conversion rule 505 in conversion rules area 416 to be highlighted, etc.

Returning to FIG. 3, once all rules have been created and the preview data approved by the user, CTE 200 may convert the selected portion(s) of the source data to target data based on the applied rules and other configuration information (block 335). Such additional configuration information may include conversion type information from target data type selection element 412, dataset name information from description element 434, or other inferred/predicted data information, etc. For example, rules execution and storage logic 240 may execute conversion/translation of the selected portion(s) of the source data based on the received conversion rules 505 and other information and may store the converted data for subsequent use.

In one implementation, conversion of the selected portion(s) of the source data to output target data may include generation of computer code corresponding to the conversion. For example, using MATLAB as an example, conversion of source data to MATLAB compatible data further comprises generation of MATLAB code that identifies the applied conversion rules 505. Such code may be used in subsequent instances to convert/translate data without requiring graphical manipulation of preview data.

Consistent with embodiments described herein, conversion rules 505 may include ordering or priority information. In this manner, created conversion rules 505 may be applied sequentially, with subsequent rules executing following execution of earlier rules. In one implementation, rule ordering may be indicated by the user by ordering conversion rules 505 graphically within conversion rule area 416. For example, in the example of FIG. 5, rule 505-3 may be executed before rule 505-2, which may be executed before rule 505-1. An order of the rules may be modified by, for example, "dragging and dropping" an established rule 505 within conversion rules area 416. The effect of a change in ordering of rules 505 may be immediately determined by pre-application logic 230 and graphically depicted in GUI 400.

Consistent with additional embodiments described herein, CTE 200 may determine incompatibilities within the selected portion of the source data based on the content of the source data and the selected type of importation/conversion and may graphically depict the incompatibilities for review by the user prior to conversion. For example, string data in the source data may be incompatible for inclusion into a numeric matrix. Pre-application logic 230 may identify the incompatibilities and may cause GUI logic 210 to provide graphical indications of the incompatibilities. For example a particular visual style (e.g., color, such as red, etc.) may be applied to the incompatible data. In addition, user selection of an indicated incompatible portion of source data 422 (e.g., "clicking," "hovering," etc.) may cause information regarding the incompatibility to be presented to the user. In one implementation, such information may take the form of a "tooltip" or other pop-up window or bubble.

In accordance with this embodiment, an additional portion of GUI 400 may be leveraged to provide conversion information, such as locations of incompatible data in the source data (e.g., rows, columns, cells, time, spatial position, etc.), locations of modified data (e.g., via conversion rules 505) in the selected portion of the source data, etc. In some implementations, pre-application logic 230 may be further configured to suggest or propose one or more conversion rules to remedy the identified incompatibilities. The proposed conversion rule may be automatically generated and inserted into conversion rules area 416.

Referring to FIG. 5, GUI 400 may be provided with a vertical scroll bar 550. Consistent with embodiments described herein, locations of conversion effects or file incompatibilities may be denoted via message elements 555 provided on vertical scroll bar 550. For example, pre-application logic 230 may, during pre-application of conversion rules 505, determine the locations of conversion effects or file incompatibilities within source data 422. Pre-application logic 230 may cause GUI logic 210 to provide message elements 555 in vertical scroll bar 550 corresponding to the determined locations.

For example, assume that a total length of scroll bar 550 corresponds to a total vertical length of source data 422. In this case, a vertical positioning of message elements 555 within scroll bar 550 may indicate a relative position of the data corresponding to the message within source data 422. For example, a message element 555 halfway down scroll bar 550 may corresponding to data halfway through source data 422.

Although not depicted in FIG. 5, in some embodiments, GUI 400 may additionally or alternatively be provided with a horizontal scroll bar indicating file incompatibilities at relative portions in a width of source data 422, e.g., in various columns of source data 422. Message elements provided in the horizontal scroll bar (similar to message elements 555) may be positioned to indicate relative locations of conversion effects or file incompatibilities.

Consistent with embodiments described herein, different messages may be indicated via visual styling (e.g., color-coding) of message elements 555. For example, identified incompatible data may be denoted by red message elements 555. In an additional implementation, effects of one or more of conversion rules 505 may be indicated by message elements 555 having a color/style corresponding to the associated conversion rule 505. In addition, user selection of a particular message element 555 (e.g., "hovering," etc.) may cause information regarding the message element 555 to be presented to the user, such as a reason for a determined incompatibility, an identification of an applied conversion rule 505, a row number associated with the data relating to the selected message element 555, etc. Such information may take the form of a "tooltip" or other pop-up window or bubble.

Figure 6:
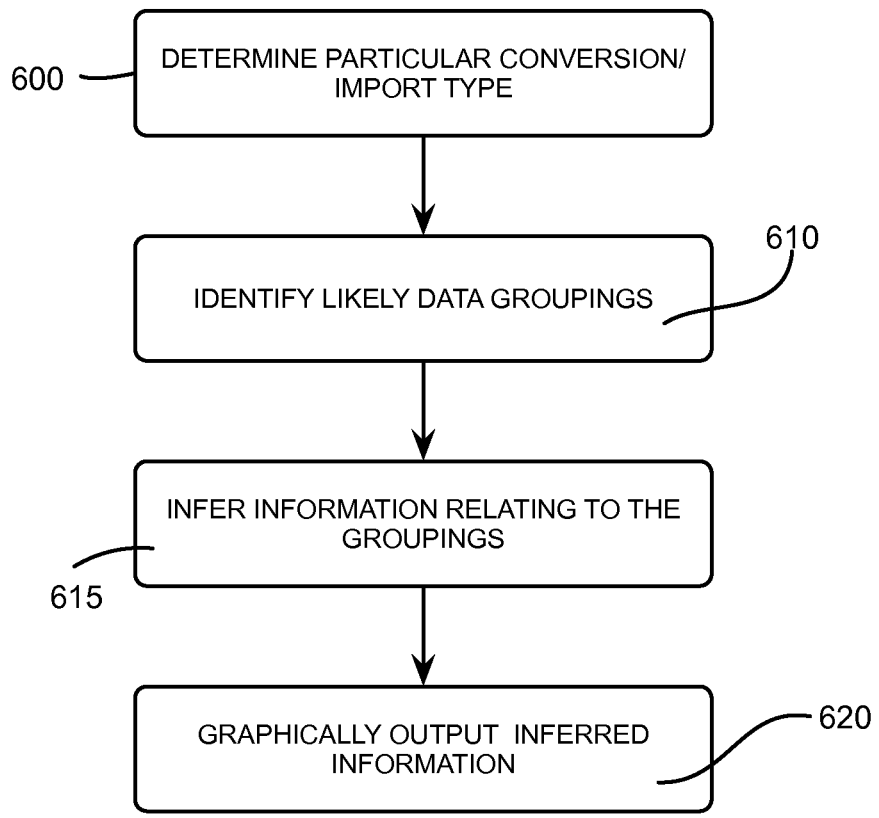
FIG. 6 illustrates a flowchart of another exemplary process for converting or translating source data from a first format to a second format in accordance with implementations described herein.

FIG. 6 is a flowchart illustrating additional embodiments of blocks 315 and 325 described above with respect to FIG. 3. More specifically, CTE 200 may determine that the user has selected a particular target data type (block 600). For example, GUI logic 210 may determine that the user has selected column vectors as the target data type via target data type selection element 412.

In response to this selection, pre-application logic 230 may identify likely data groupings in the source data (block 610), infer information regarding the identified groupings (block 615) and may provide inferred information regarding the source data as metadata for the target data (block 620). For example, assuming that user has selected column vectors as the target data type, pre-application logic 230 may identify likely column vectors (e.g., one dimensional arrays of numerical data) in the source data, infer column vector information (e.g., name and size information) based on the source data in relation to the selected portion 430 of the source data 422, and may provide a graphical indication of the inferred information via GUI 400. In this example, the inferred data includes variable names and array sizes associated with the determined column vectors.

Figure 7:
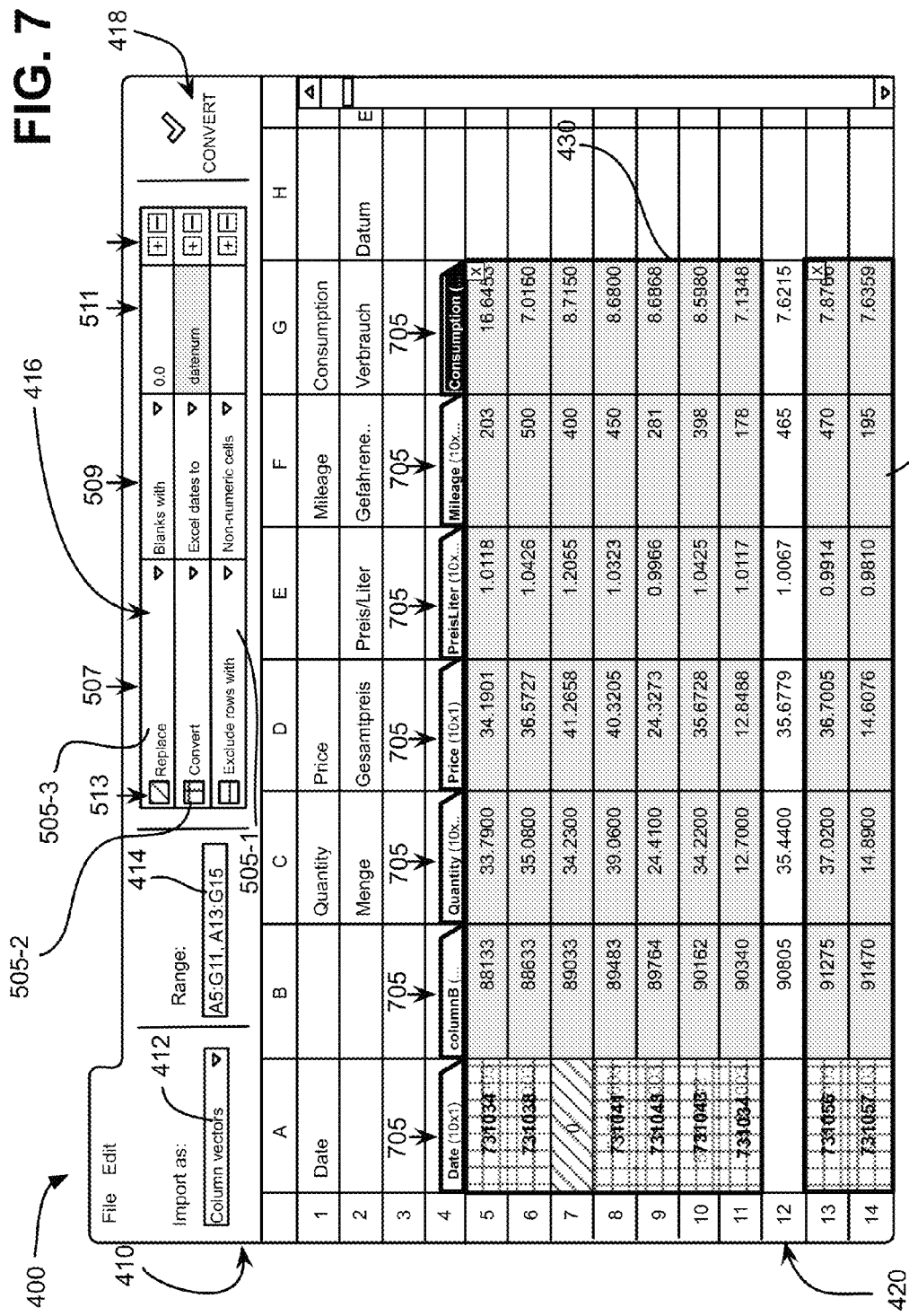

FIG. 7 illustrates GUI 400 of FIG. 4 following selection of "column vectors" as a conversion/importation type. As shown, data preview area 420 may include selected portion 430 and a number of description elements 705 corresponding to each of a corresponding number of identified column vectors. Each description element 705 may include an inferred variable name corresponding to the associated column vector.

Consistent with implementations described herein, pre-application logic 230 may infer variable name information based on text information included in source data 422 corresponding to the identified column vector. For example, column C in source data 422 may include a heading "Quantity" in row 1. Although row 1 of the source data is not included in the inferred column vector for column C and is not included in the selected portion 430 of source data 422, the information provided therein may be used to infer a variable name for associated with the corresponding identified column vector (e.g., data in cells C5 to C:11 and C13 to C15. This inferred variable name is provided to the user in the corresponding description element 705.

The user may interact with description elements 705 to edit the variable name associated with each column vector. Although column vectors are referred to specifically in FIG. 7, data regarding other target data types may be similarly inferred, such as matrix names, etc.

Figure 8:
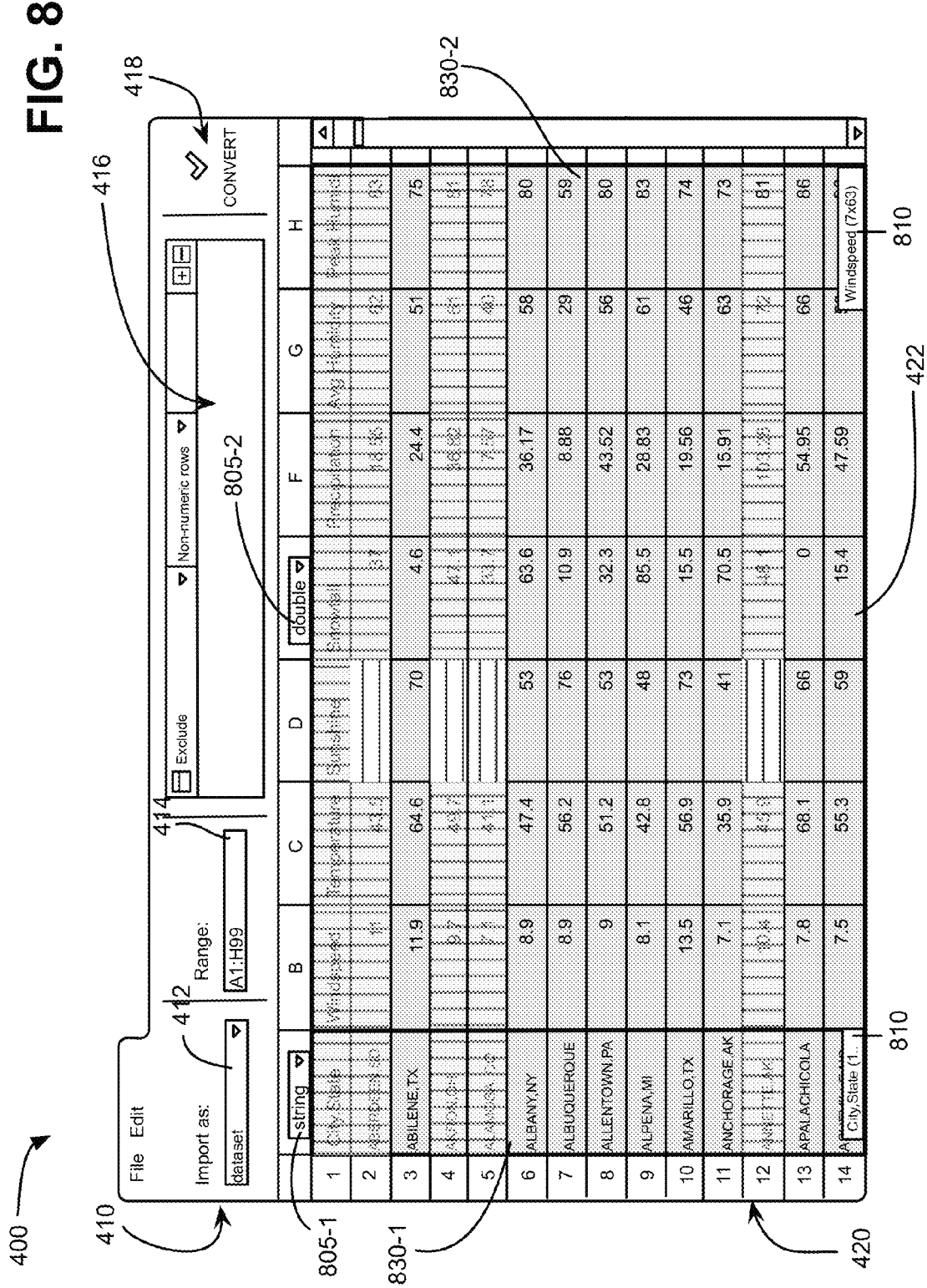

FIG. 8 illustrates GUI 400 of FIG. 4 following selection of "datasets" as a conversion/importation type via target data type selection element 412. As shown, data preview area 420 may include a number of selected portions 830 each corresponding to particular data type in the dataset to be created via the data conversion/import process. In some implementations, portions 830 are automatically or inferentially determined by pre-application logic 230 based on a content of the source data. In other embodiments, portions 830 may be selected by the user via GUI 400. For the example of FIG. 8, two data types have been identified, a string array 830-1 and a numerical matrix 830-2 (sometimes referred to as a matrix of doubles, in reference to the double precision floating point accuracy of the stored numerical data).

A number of data type description elements 805 may be provided corresponding to each of the identified data types. For example, data type description element 805-1 and 805-2 each identify the type of data associated with the corresponding portion 830. In the example of FIG. 8, data type description element 805-1 identifies portion 830-1 as a string and data type description element 805-2 identifies portion 830-2 as a "double" (e.g., a matrix of double precision numerals). The user may interact with data type description elements 805 to edit the data type by, for example, selecting from a number of possible data types.

In addition to data type description elements 805, GUI 400 may also provide a number of variable description elements 810 corresponding to data portions 830. Each variable description element 810 may include an inferred variable name corresponding to the associated data portion. Consistent with implementations described herein, pre-application logic 230 may infer variable name information based on text information included in source data 422.

Figure 9:
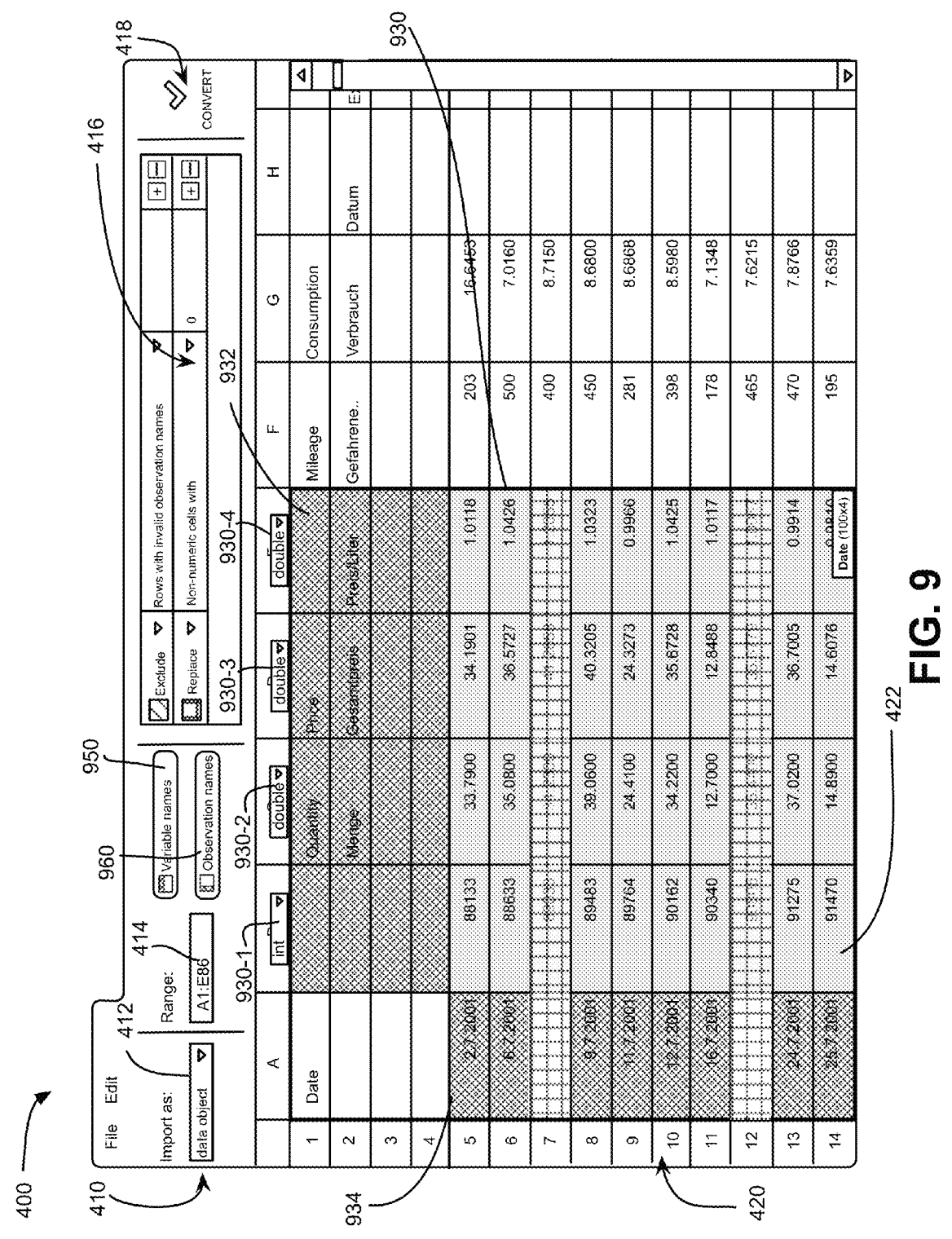

FIG. 9 illustrates GUI 400 of FIG. 4 following selection of "data object" as a conversion/importation type via target data type selection element 412. As shown, data preview area 420 may include a selected portion 930 corresponding to a data object to be created based on source data 422 via the data conversion/import process. In some implementations, portion 930 is automatically or inferentially determined by pre-application logic 230 based on a content of the source data and the user selection of the target data type. In other embodiments, portion 930 may be selected by the user via GUI 400.

For the example of FIG. 9, a single data object 930 has been identified that includes an integer array 930-1, and three numerical matrices 930-2 to 930-4 (sometimes referred to as a matrix of doubles or simply "doubles"). Consistent with embodiments described herein, configuration area 410 associated with the data object target data type may include a variable names selection element 950 and an observation names selection element 960. Users may interact with GUI 400 to select sub-portions corresponding to each of the variable names and observation names. Selection of specific variable names selection element 950 and an observation names selection element 960 may then enable pre-application logic 230 to determine which selected sub-portions 932 and 934 correspond to which type of information.

In the example of FIG. 9, the orientation of an icon in variable names selection element 950 indicates that a top, horizontal sub portion 932 corresponds to the variable names information. Similarly, the orientation of an icon in observation names selection element 960 indicates that a left side, vertical sub portion 934 corresponds to the observation names information.

Although described in FIG. 9 in relation to variable and observation names information, implementations described herein may enable any object elements to be defined within the context of CTE 200 based on position and configuration of selected portions of source data 422. In addition, pre-application logic 230 may perform inferential determinations based on the source data to identify the most likely types of data or data groupings. In addition, CTE 200 may provide an application programming interface (API) for enabling extension of the data object creation embodiments to other data object types.

Although the embodiment of FIGS. 4, 5, and 7-9 depict source data 422 and data preview area 420 as having a spreadsheet-like configuration, other configurations are suitable for different types of data. For example, an image, audio waveform, or linear video representation may be provided in data preview area for handling by CTE 200.

Figure 10:
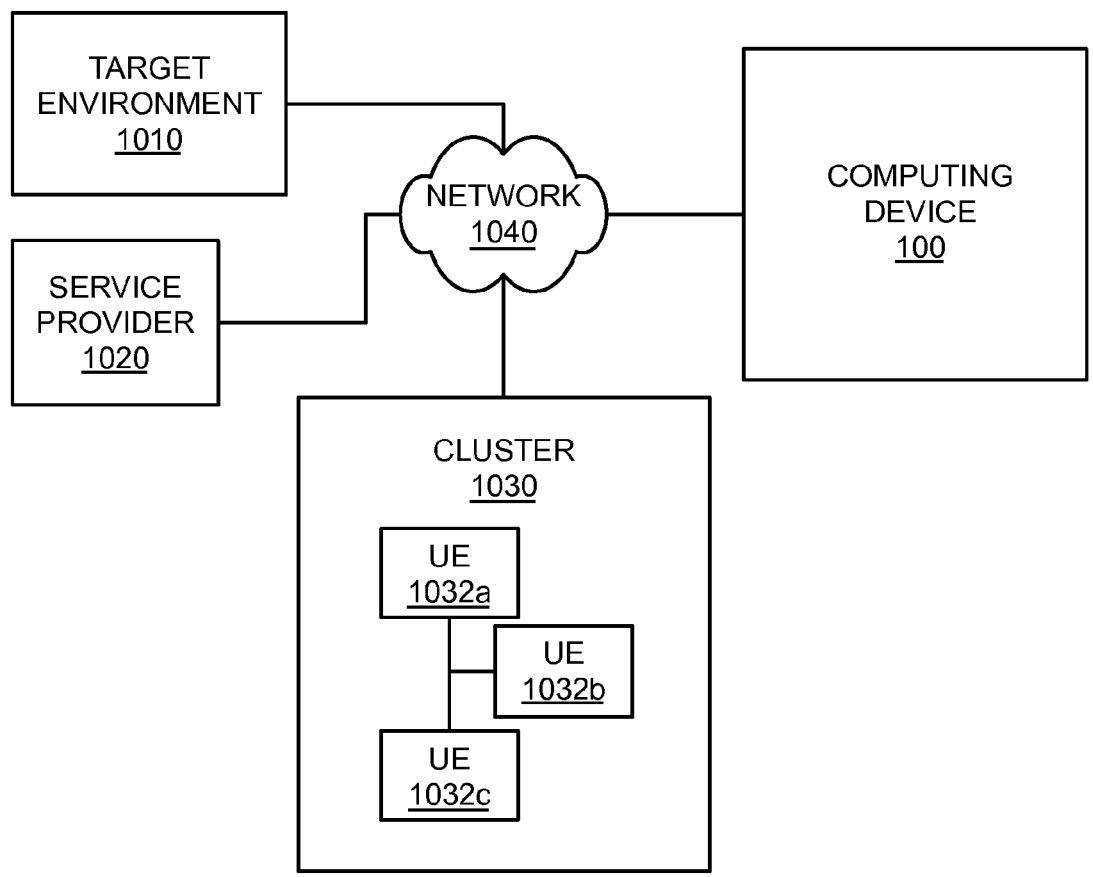
FIG. 10 illustrates an example of a distributed environment that may be configured to implement one or more embodiments of the invention.

One or more embodiments of the invention may be implemented in a distributed environment. FIG. 10 illustrates an example of a distributed environment 1000 that may be configured to implement one or more embodiments of the invention. Referring to FIG. 10, environment 1000 may contain various entities including computing device 100, target environment 1010, service provider 1020, cluster 1030, and network 1040. Note that the distributed environment illustrated in FIG. 10 is just one example of an environment that may be used with embodiments of the invention. Other distributed environments that may be used with embodiments of the invention may contain more entities, fewer entities, entities in arrangements that differ from the arrangement illustrated in FIG. 10, and so on.

Details of computing device 100 were described above with respect to FIG. 1. In distributed environment 1000, computing device 100 may be configured to, among other things, exchange information (e.g., data) with other entities (e.g., target environment 1010, service provider 1020, and cluster 1030) in network 1040. Computing device 100 may interface with network 1040 via communication interface 180.

Network 1040 may include a communication network capable of exchanging information between the entities in network 1040. The network 1040 may include digital and/or analog aspects. The information may include machine-readable information having a format that may be adapted for use, for example, in the network 1040 and/or with one or more entities in network 1040. For example, the information may be encapsulated in one or more packets that may be used to transfer the information through network 1040.

Information may be exchanged between entities using various network protocols, such as, but not limited to, the Internet Protocol (IP), Asynchronous Transfer Mode (ATM), Synchronous Optical Network (SONET), the User Datagram Protocol (UDP), Transmission Control Protocol (TCP), Institute of Electrical and Electronics Engineers (IEEE) 802.11, etc.

Network 1040 may comprise various network devices, such as gateways, routers, switches, firewalls, servers, repeaters, address translators, etc. Portions of network 1040 may be wired (e.g., using wired conductors, optical fibers, etc.) and/or wireless (e.g., using free-space optical (FSO), radio frequency (RF), acoustic transmission paths, etc.). Portions of network 1040 may include a substantially open public network, such as the Internet. Portions of network 1040 may include a more restricted network, such as a private corporate network or virtual private network (VPN). It should be noted that implementations of networks and/or devices operating on networks described herein are not limited with regards to information carried by the networks, protocols used in the networks, the architecture/configuration of the networks, etc.

Service provider 1020 may include logic (e.g., software) that makes a service available to another entity in distributed environment 1000. Service provider 1020 may also include a server operated by, for example, an individual, a corporation, an educational institution, a government agency, and so on, that provides one or more services to a destination, such as computing device 100. The services may include software containing computer-executable instructions that implement one or more embodiments of the invention or portions thereof, and may be executed, in whole or in part, by (1) a destination, (2) service provider 1020 on behalf of the destination, or (3) some combination thereof.

For example, in an embodiment, service provider 1020 may provide one or more subscription-based services that may be available to various customers. The services may be accessed by a customer via network 1040. The customer may access the services using a computing device, such as computing device 100. The services may include services that implement one or more embodiments of the invention or portions thereof. Service provider 1020 may limit access to certain services based on, e.g., a customer service agreement between the customer and service provider 1020.

The service agreement may allow the customer to access the services that may allow the customer to build, execute, and/or analyze a model, such as model 210, as described above. The service agreement may include other types of arrangements, such as certain fee-based arrangements or restricted access arrangements. For example, a customer may pay a fee which provides the customer unlimited access to a given package of services for a given time period (e.g., per minute, hourly, daily, monthly, yearly, etc.). For services not included in the package, the customer may have to pay an additional fee in order to access the services. Still other arrangements may be resource-usage based. For example, the customer may be assessed a fee based on an amount of computing resources or network bandwidth used.

Cluster 1030 may include a number of units of execution (UEs) 1032 that may perform processing of one or more embodiments of the invention or portions thereof on behalf of computing device 100 and/or another entity, such as service provider 1020. UEs 1032 may reside on a single device or chip or on multiple devices or chips. For example, UEs 1032 may be implemented in a single ASIC or in multiple ASICs. Likewise, UEs 1032 may be implemented in a single computing device or multiple computing devices. Other examples of UEs 1032 may include FPGAs, CPLDs, ASIPs, processors, multiprocessor systems-on-chip (MPSoCs), graphic processing units, microprocessors, etc.

UEs 1032 may be configured to perform operations on behalf of another entity. For example, in an embodiment, UEs 1032 are configured to execute portions of code associated with the CTE 200. Here, CTE 200 may dispatch certain activities pertaining to one or more embodiments of the invention to UEs 1032 for execution. Service provider 1020 may configure cluster 1030 to provide, for example, the above-described services to computing device 100 on a subscription basis (e.g., via a web service).

It should be noted that one or more embodiments of the invention may be implemented in environments other than a CTE. For example, one or more embodiments of the invention may be implemented in an operating system, such as OS 132, a window manager, such as WM 134, an application (e.g., Excel), a driver, and so on. Moreover, one or more embodiments of the invention may be adapted to operate in environments that may be multidimensional (e.g., 2-D, 3-D, etc.).

The foregoing description of embodiments is intended to provide illustration and description, but is not intended to be exhaustive or to limit the invention to the precise form disclosed. Modifications and variations are possible in light of the above teachings or may be acquired from practice of the invention. For example, while a series of acts has been described above with respect to FIGS. 3 and 6, the order of the acts may be modified in other implementations. Further, non-dependent acts may be performed in parallel.

Also, the term "user", as used herein, is intended to be broadly interpreted to include, for example, a computing device (e.g., a workstation) or a user of a computing device, unless otherwise stated.

It will be apparent that embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain embodiments of the invention may be implemented as "logic" that performs one or more functions. This logic may be hardware-based, software-based, or a combination of hardware-based and software-based. The logic may be stored in one or more computer-readable storage media and may include computer-executable instructions for execution by processing logic, such as processing logic 120. The computer-executable instructions may be configured to implement one or more embodiments of the invention. The computer-readable storage media may be volatile or non-volatile and may include, for example, flash memories, removable disks, non-removable disks, and so on.

In addition, it should be noted that various electromagnetic signals, such as wireless signals, electrical signals carried over a wire, optical signals carried over optical fiber, etc., may be encoded to carry data and/or computer-executable instructions, configured to implement one or more embodiments of the invention, on, for example, a communication network, such as network 1040.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A memory device to store instructions, the instructions comprising:
one or more instructions that, when executed by a processor, cause the processor to:
receive data in a first format,
the data including first information associated with a first information type and second information associated with a second information type, and
the first information type and the second information type being different;
provide the data for display via a graphical interface;
determine one or more translation rules, of a plurality of translation rules, associated with converting the data to a second format that is different from the first format;
determine respective effects associated with applying the one or more translation rules to the first information type and to the second information type,
the one or more translation rules affecting the first information type differently than the second information type;
provide information associated with the respective effects for display via the graphical interface;
determine that the first information is compatible with the second format and that the second information is incompatible with the second format;
apply a first visual style to the first information to modify a display of the first information,
the first visual style indicating that the first information is compatible with the second format, and
the first visual style providing the first information in the second format for display via the graphical interface in conjunction with the first information in the first format;
apply a second visual style to the second information to modify a display of the second information,
the second visual style indicating that the second information is incompatible with the second format; and
provide information identifying one or more rules for converting the second information into the second format.

2. The memory device of claim 1, where the instructions further comprise:
one or more instructions that, when executed by the processor, cause the processor to:
convert the data from the first format to the second format based on the one or more translation rules; and
provide the converted data for display via the graphical interface.

3. The memory device of claim 2, where the one or more instructions to convert the data from the first format to the second format, when executed by the processor, further cause the processor to:
generate code based on the one or more translation rules, and
apply the code to the data; and
where the one or more instructions to determine the respective effects associated with applying the one or more translation rules to the first information type and to the second information type, when executed by the processor, further cause the processor to:
determine respective compatibilities of the code with the first information type and the second information type.

4. The memory device of claim 1, where the one or more instructions to provide the information associated with the respective effects, when executed by the processor, further cause the processor to:
determine a first portion of the data affected by a translation rule of the one or more translation rules and a second portion of the data unaffected by the translation rule; and
provide the data for display via the graphical interface,
the first portion of the data being presented using a visual style associated with the translation rule based on the first portion of the data being affected by the translation rule.

5. The memory device of claim 1, where the one or more instructions to provide the information associated with the respective effects, when executed by the processor, further cause the processor to:
provide portions of the data for display at respective regions of the graphical interface; and
provide information associated with converting a particular portion, of the portions of the data, to the second format for display, the information associated with converting the particular portion being provided at a corresponding region of the graphical interface associated with the particular portion, and
the information associated with converting the particular portion indicating whether the particular portion is compatible with the second format.

6. The memory device of claim 5, where the instructions further comprise:
one or more instructions that, when executed by the processor, cause the processor to:
receive, via the graphical interface, information associated with a selection of one of the particular portion or the corresponding region of the graphical interface,
the information associated with converting the particular portion being provided for display at the corresponding region based on the selection.

7. The memory device of claim 1, where the one or more instructions to determine the one or more translation rules, when executed by the processor, further cause the processor to:
provide information associated with the plurality of translations rules for display via the graphical interface; and
receive, via the graphical interface, information associated with:
a selection of the one or more translation rules from the plurality of translations rules; and
an order to apply the one or more translation rules to the data.

8. A system comprising:
one or more devices to:
receive data in a first format,
the data including first information associated with a first information type and second information associated with a second information type, and
the first information type and the second information type being different,
provide the data for display via a graphical interface,
determine one or more translation rules, of a plurality of translation rules, associated with converting the data to a second format that is different from the first format,
determine respective effects associated with applying the one or more translation rules to the first information type and to the second information type,
the one or more translation rules affecting the first information type differently than the second information type,
provide information associated with the respective effects for display via the graphical interface,
the information identifying differences between applying the one or more translation rules to the first information type and to the second information type;
determine that the first information is compatible with the second format and that the second information is incompatible with the second format;
apply a first visual style to the first information to modify a display of the first information,
the first visual style indicating that the first information is compatible with the second format, and
the first visual style providing the first information in the second format for display via the graphical interface in conjunction with the first information in the first format;
apply a second visual style to the second information to modify a display of the second information,
the second visual style indicating that the second information is incompatible with the second format; and
provide information identifying one or more rules for converting the second information into the second format.

9. The system of claim 8, where the one or more devices are further to:
convert the data from the first format to the second format based on the one or more translation rules, and
provide the converted data for display via the graphical interface.

10. The system of claim 9, where, when converting the data from the first format to the second format, the one or more devices are to:
generate code based on the one or more translation rules, and
apply the code to the data, and
where, when determining the respective effects associated with converting the first information type and the second information type, the one or more devices are to:
determine respective compatibilities of the code with the first information type and the second information type.

11. The system of claim 8, where, when providing the information associated with the respective effects, the one or more devices are to:
determine a first portion of the data affected by a translation rule of the one or more translation rules and a second portion of the data unaffected by the translation rule, and
provide the data for display via the graphical interface,
the first portion of the data being presented using a visual style associated with the translation rule.

12. The system of claim 8, where, when providing the information associated with the respective effects, the one or more devices are to:
provide portions of the data for display at respective regions of the graphical interface, and
provide information associated with converting a particular portion, of the portions of the data, to the second format for display,
the information associated with converting the particular portion being provided at a corresponding region of the graphical interface associated with the particular portion, and
the information associated with converting the particular portion indicating whether the portion is compatible with the second format.

13. The system of claim 12, where the one or more devices are further to:
receive, via the graphical interface, information associated with a selection of one of the particular portion or the corresponding region of the graphical interface,
the information associated with converting the particular portion being provided for display at the corresponding region based on the selection.

14. The system of claim 8, where, when determining the one or more translation rules, the one or more devices are to:
provide information associated with the plurality of translations rules for display via the graphical interface, and
receive, via the graphical interface, information associated with:
a selection of the one or more translation rules from the plurality of translations rules, and
an order to apply the one or more translation rules to the data.

15. A method comprising:
providing data for display in a graphical interface,
the data being in a first format,
the data including first information associated with a first information type and second information associated with a second information type that differs from the first information type, and
providing the data for display being performed by one or more processors;
receiving, via the graphical interface, a selection of one or more translation rules from a plurality of translation rules,
the plurality of translation rules being associated with converting the data to a second format that is different from the first format, and
receiving the selection being performed by the one or more processors;
determining respective effects associated with applying the one or more translation rules to the first information type and to the second information type,
the one or more translation rules affecting the first information type differently than the second information type, and
determining the respective effects being performed by the one or more processors;
providing information associated with the respective effects for display via the graphical interface,
providing the information associated with the respective effects for display being performed by the one or more processors;
determining that the first information is compatible with the second format and that the second information is incompatible with the second format,
determining that the first information is compatible with the second format and that the second information is incompatible with the second format being performed by the one or more processors;
applying a first visual style to the first information to modify a display of the first information,
applying the first visual style being performed by the one or more processors, and
the first visual style indicating that the first information is compatible with the second format, and
the first visual style providing the first information in the second format for display via the graphical interface in conjunction with the first information in the first format;
applying a second visual style to the second information to modify a display of the second information,
applying the second visual style being performed by the one or more processors, and
the second visual style indicating that the second information is incompatible with the second format; and
providing information identifying one or more rules for converting the second information into the second format,
providing the information identifying the one or more rules for converting the second information being performed by the device.

16. The method of claim 15, further comprising
converting the data using the one or more translation rules; and
providing the converted data for display via the graphical interface.

17. The method of claim 16, where converting the data includes:
generating code based on the one or more translation rules, and
applying the code to the data; and
where determining the respective effects associated with converting the first information type and the second information type includes:
determining respective compatibilities of the code with the first information type and the second information type.

18. The method of claim 15, where providing information associated with the respective effects includes:
determining a first portion of the data affected by a translation rule of the one or more translation rules and a second portion of the data unaffected by the translation rule; and
modifying a presented version of the first portion of the data, in the graphical interface, using a visual style associated with the translation rule.

19. The method of claim 15, where providing the data for display includes:
providing portions of the data for display at respective regions of the graphical interface, and
where providing the information associated with the respective effects includes:
providing information associated with applying the one or more translation rules to a particular portion, of the portions of the data, for display at a corresponding region of the graphical interface associated with the particular portion.

20. The method of claim 19, further comprising:
receiving, via the graphical interface, information associated with a selection of one of the particular portion or the corresponding region of the graphical interface,
the information associated with applying the one or more translation rules to the particular portion being provided for display at the corresponding region based on the selection.

* * * * *